(12) United States Patent
Yoshikawa et al.

(10) Patent No.: US 7,733,122 B2
(45) Date of Patent: Jun. 8, 2010

(54) SEMICONDUCTOR DEVICE

(75) Inventors: Takashi Yoshikawa, Kawasaki (JP);
Shigehiro Asano, Yokosuka (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/369,522

(22) Filed: Feb. 11, 2009

(65) Prior Publication Data

US 2009/0206874 A1 Aug. 20, 2009

(30) Foreign Application Priority Data

Feb. 15, 2008 (JP) ............................... 2008-035169

(51) Int. Cl.
*G06F 7/38* (2006.01)
*H03K 19/173* (2006.01)
(52) U.S. Cl. ............................... 326/38; 326/39; 326/41
(58) Field of Classification Search ............. 326/38–39, 326/41
See application file for complete search history.

(56) References Cited

U.S. PATENT DOCUMENTS 5,745,734 A   4/1998  Craft et al. .................. 395/500
7,253,657 B2*  8/2007  Krishnappa et al. ............ 326/38
7,382,293 B1*  6/2008  Wicker ........................ 341/67
7,653,805 B2*  1/2010  Yoshikawa et al. ............ 712/37
2007/0245131 A1  10/2007  Yoshikawa et al. .......... 712/220

OTHER PUBLICATIONS

Goldstein, et al..; "PipeRench: A Reconfigurable Architecture and Compiler"; 2000, IEEE, pp. 70-77.
Sueyoshi, et al., "Reconfigurable System"; Ohmsha Ltd., pp. 189-208; Aug. 25, 2005 (as described in the specification).

* cited by examiner

*Primary Examiner*—Anh Q Tran
(74) *Attorney, Agent, or Firm*—Ohlandt, Greeley, Ruggiero & Perle, L.L.P

(57) ABSTRACT

A first operation unit stores first code information having a bit length shorter than a first set bit, receives dictionary information expressing each set bit corresponding to each code information, reads the set bit corresponding to the first code information from the dictionary information to obtain the first set bit, and further, changes setting according to the first set bit to execute any of a plurality of operations so as to obtain an operation result. A second operation unit stores second code information having a bit length shorter than a second set bit, receives the dictionary information from the first operation unit, reads the set bit corresponding to the second code information from the dictionary information to obtain the second set bit, and further, changes setting according to the second set bit so as to execute any of the operations with respect to the operation result.

8 Claims, 11 Drawing Sheets

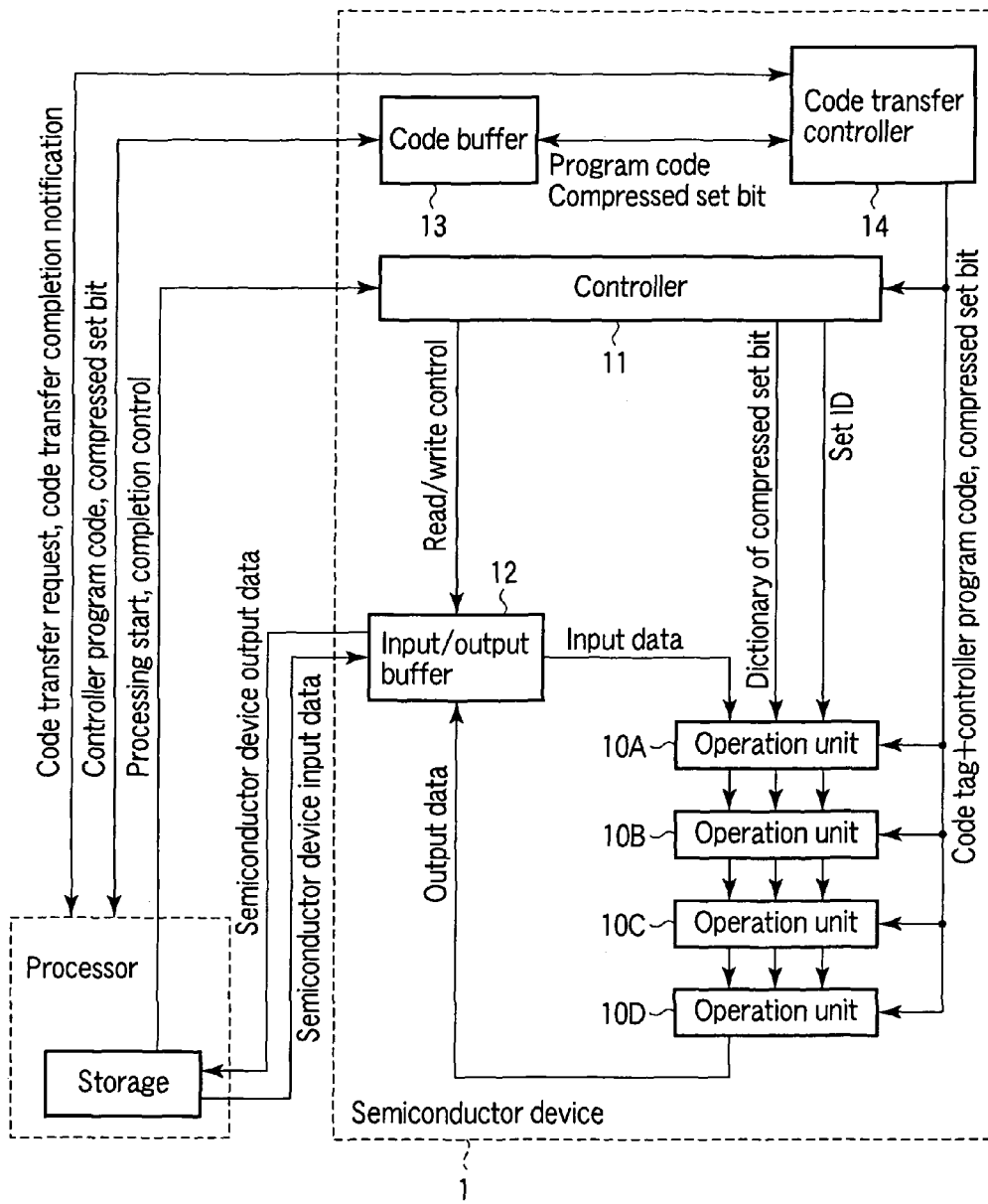
F I G. 1

| Input address | ValidI | Output address | ValidO | Set ID |
|---|---|---|---|---|
| Input address | ValidI | Output address | ValidO | Set ID |

⋮

| Input address | ValidI | Output address | ValidO | Set ID |

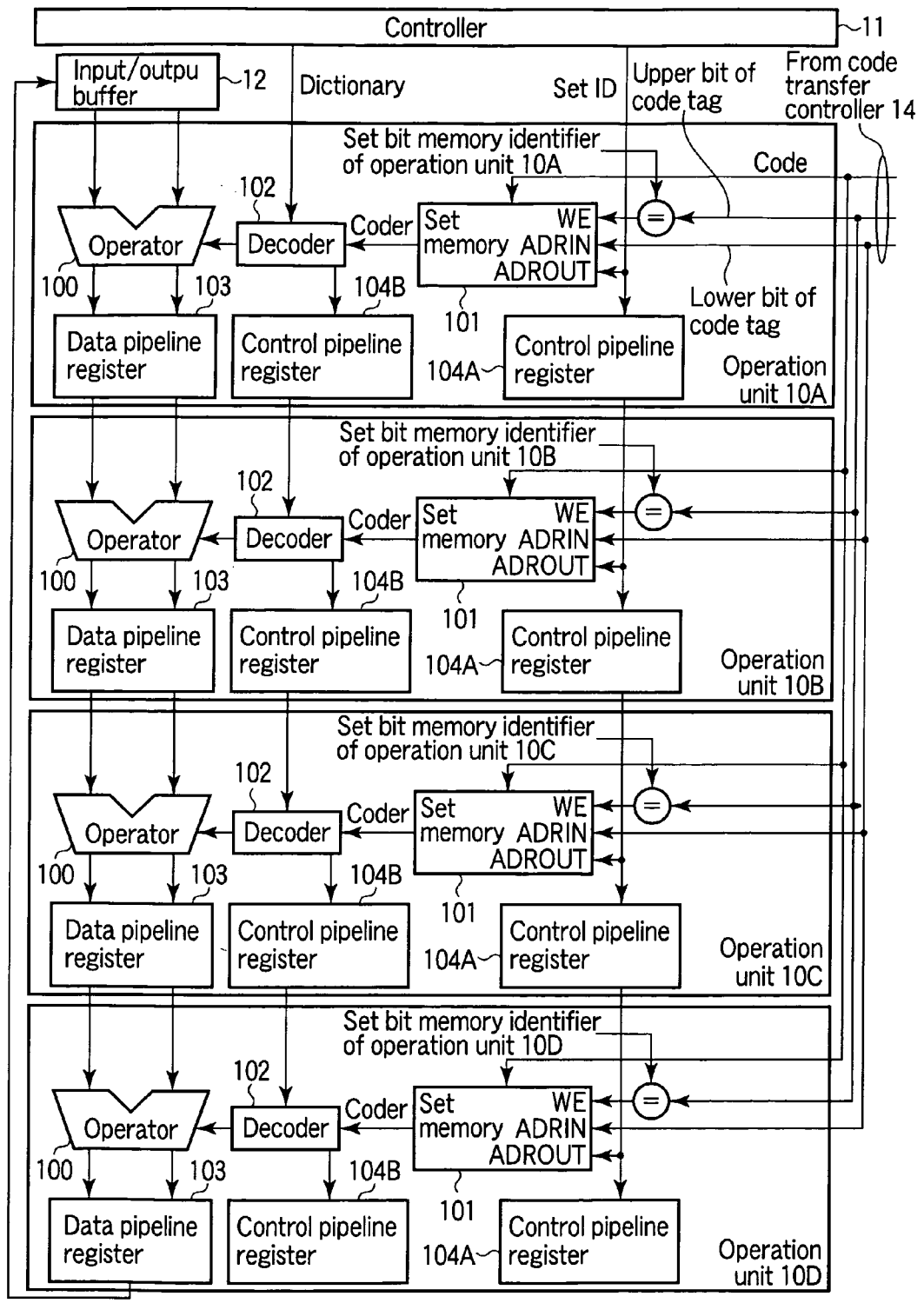
F I G. 6

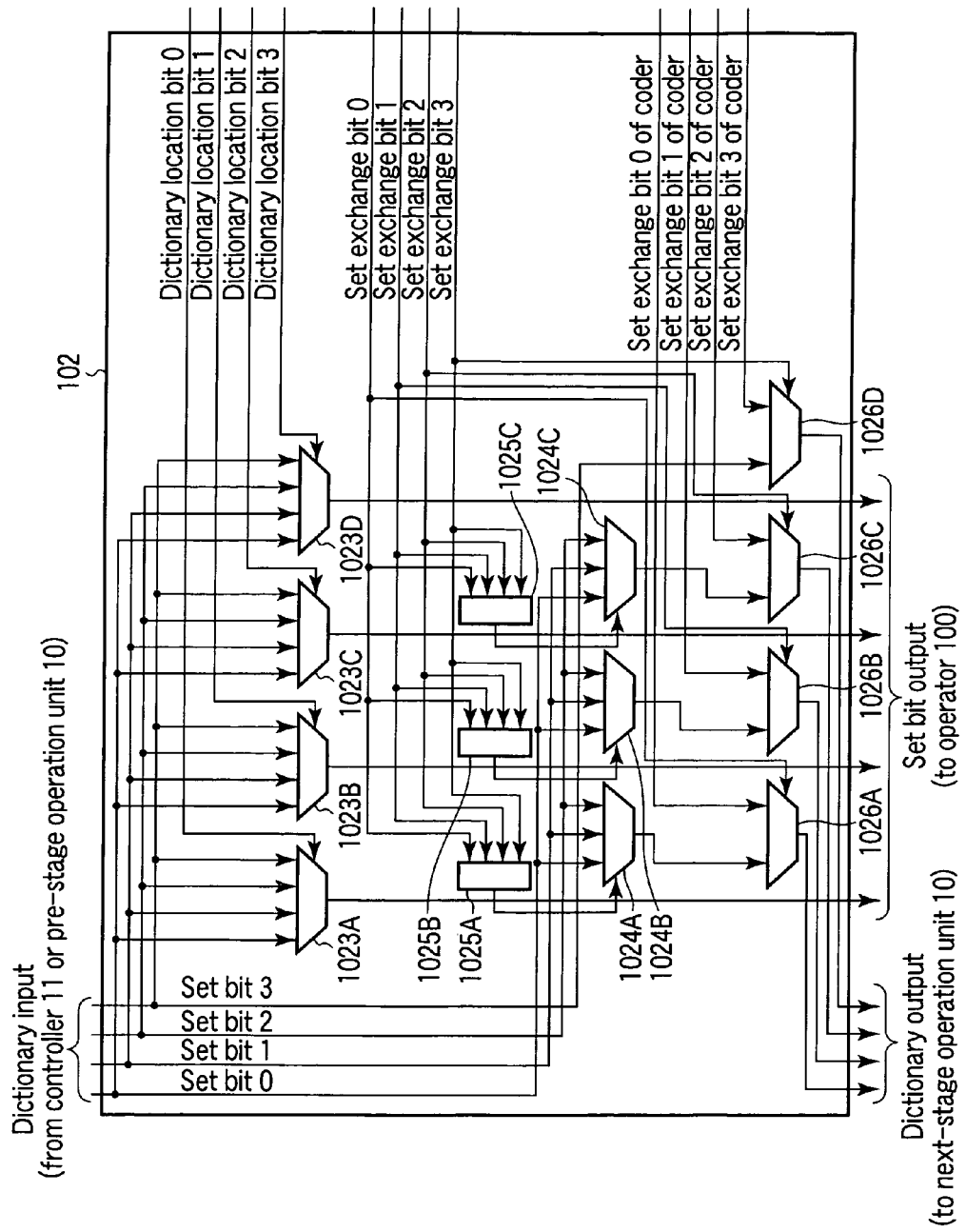
F I G. 13

SEMICONDUCTOR DEVICE

CROSS-REFERENCE TO RELATED APPLICATIONS

This application is based upon and claims the benefit of priority from prior Japanese Patent Application No. 2008-035169, filed Feb. 15, 2008, the entire contents of which are incorporated herein by reference.

BACKGROUND OF THE INVENTION

1. Field of the Invention

The present invention relates to a semiconductor device using a dynamically reconfigurable circuit technique.

2. Description of the Related Art

Recently, advance in functional complication and variety is made in apparatuses requiring low cost and low power consumption, such as a mobile apparatus. Thus, such an apparatus requires high function. In order to achieve both high function and low power consumption, a special hardware must be manufactured and developed. However, the foregoing advance in functional complication and variety is a factor of increasing the cost of manufacturing and developing the specific hardware year by year. A semiconductor device using a dynamically reconfigurable circuit technique has attracted interests as a device for reducing the cost of manufacturing and developing the special hardware.

The semiconductor device using a dynamically reconfigurable circuit technique is provided with a reconfigurable circuit such as FPGA and a storage. The storage stores a plurality of set information required for configuring a circuit (hereinafter, referred to as execution circuit) executed by the reconfigurable circuit. The foregoing semiconductor device is a device which reads circuit information necessary for an operation to configure an execution circuit according to a rule predetermined by software. The foregoing semiconductor device differs from the conventional semiconductor device using a FPGA in that the execution circuit is changed in an operation.

The foregoing semiconductor device is used, and thereby, the cost of developing a special hardware is reduced like the FPGA. In addition, the execution circuit is dynamically configured, and thereby, various functions are realizable on a small semiconductor device. Thus, it is expected to reduce the cost of manufacturing the special hardware.

The following examples are given as the semiconductor device using a dynamically reconfigurable circuit technique. One is NEC Electronics, DRP (Dynamically Reconfigurable Processor, ""Reconfigurable system", Ohm Company, page 189-208. Another is University of Carnegie Melon, Piperench ("PipeRench: a reconfigurable architecture and compiler", IEEE Computer volume 33, Issue 4, April 2000 page(s): 70-77").

The DRP of NEC Electronics has the following configuration. According to the configuration, a basic element executing an operation, that is, PEs (Processing Elements) are arrayed tow-dimensionally, and a state transition controller is arranged on the center. The PE is an operation device capable of configuring an execution circuit. A command memory in the PE is stored with a plurality of set information such as a kind of operation and the connection relationship between PEs. Each PE reads set information from the command memory according to a command pointer given from the state transition controller, and then, dynamically configures an execution circuit.

The Piperench of University of Carnegie Melon has the following configuration. According to the configuration, a stripe comprising a basic element executing an operation, that is, a plurality of PEs and a bus connecting them are connected like a pipeline. The PE is an operation device capable of configuring an execution circuit, and connected with a controller existing outside the PipeRench via a global bus. PE set information such as a kind of operation and the bus connection relationship is transferred from the controller existing outside the PipeRench to the PE via the global bus. According to the foregoing information, the PE dynamically configures an execution circuit.

The following condition must be satisfied in order to realize a semiconductor device using a dynamically reconfigurable circuit, which has a high function, small area and low power consumption. Namely, when a semiconductor device executes processing, set information required for the next processing must be stored in a storage at a high speed as much as possible. Thus, even if the size of the storage previously included in the semiconductor device is small, various execution circuits are configurable on the semiconductor device without a big delay. Therefore, it is possible to realize a semiconductor device, which has a high function, small area and low power consumption.

However, the conventional semiconductor device using the dynamically reconfigurable circuit has the following problem. Specifically, the size of set information to be written to the storage for executing a processing is not sufficiently small. For this reason, when the semiconductor device executes a processing, it is difficult to sufficiently store set information required for the next processing.

The foregoing PipeRench and DRP have the following problem. Specifically, a set change of the semiconductor device is limited to a rough set change such as a change of operation kind; however, the size of set information is not sufficiently small.

The following method is given as a method of making small the size of set information written to the storage included in the semiconductor device using the dynamically reconfigurable circuit. According to the method, the storage of the semiconductor device is stored with set information compressing information by a compression coding capable of restoring the original set information (hereinafter, referred to as compression). Then, the set information is properly decoded when an execution circuit is configured.

However, the foregoing PipeRench and DRP have the following problem. Specifically, one controller concurrently gives instructions to configure an execution circuit to a plurality of dynamically reconfigurable circuits. For this reason, the number of the dynamically reconfigurable circuits controlled by the controller increases to some degree, and thereby, time is taken to decode. As a result, the processing performance of the semiconductor device is reduced.

BRIEF SUMMARY OF THE INVENTION

According to one aspect of the present invention, there is provided a semiconductor device comprising a first operation unit and a second operation unit. The first operation unit stores first code information having a bit length shorter than a first set bit, receives dictionary information expressing each set bit corresponding to each code information, reads the set bit corresponding to the first code information from the dictionary information to obtain the first set bit, and further, changes setting according to the first set bit to execute any of a plurality of operations so as to obtain an operation result. The second operation unit stores second code information having a bit length shorter than a second set bit, receives the dictionary information from the first operation unit, reads the set bit corresponding to the second code information from the dictionary information to obtain the second set bit, and further, changes setting according to the second set bit so as to execute any of the operations with respect to the operation result.

BRIEF DESCRIPTION OF THE SEVERAL VIEWS OF THE DRAWING

FIG. 1 is a block diagram showing a semiconductor device according to one embodiment;

FIG. 6 is a block diagram showing an operation unit according to one embodiment;

FIG. 13 is a block diagram showing a decoder in the compression method 3 according to one embodiment.

DETAILED DESCRIPTION OF THE INVENTION

Figure 2:
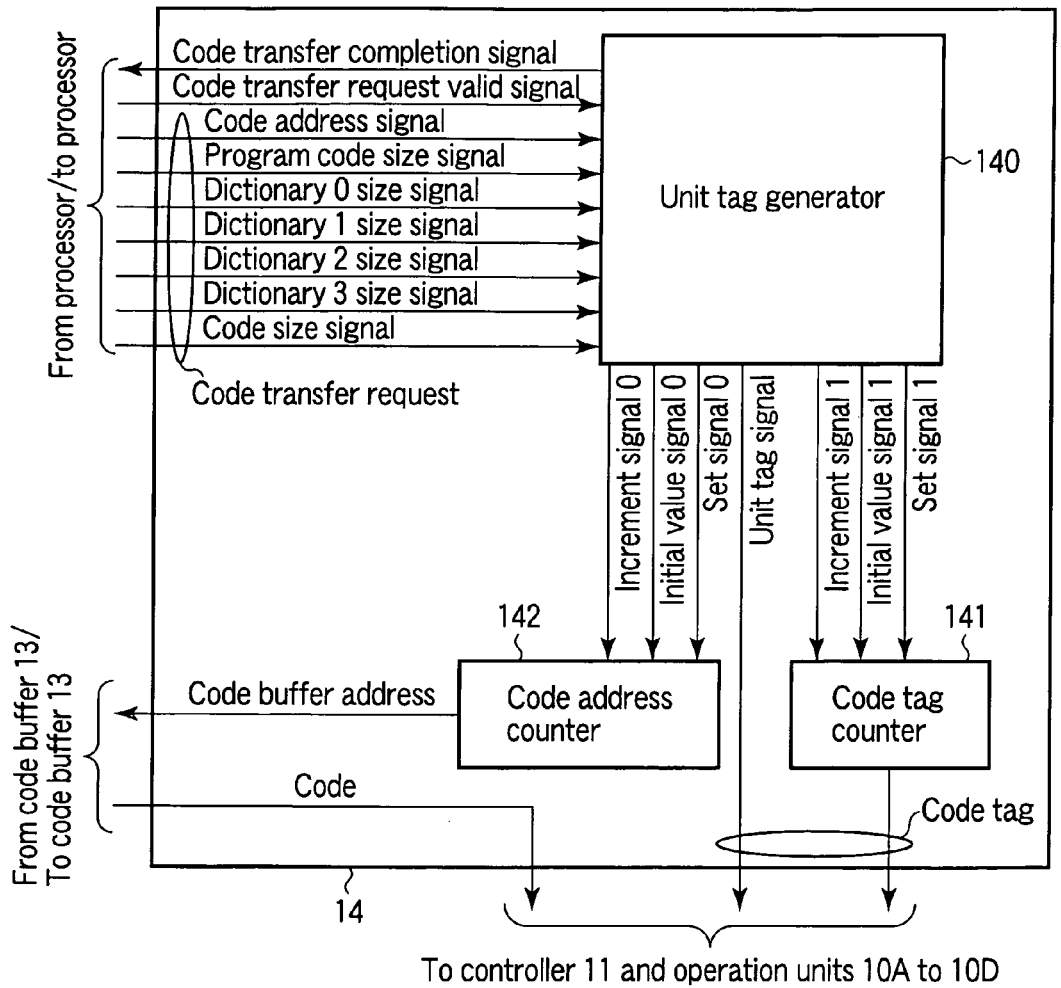
FIG. 2 is a block diagram showing a code transfer controller according to one embodiment.

Referring now to FIG. 1, a semiconductor device 1 according to an embodiment is shown. The semiconductor device 1 is a reconfigurable device, which executes data processing according to instructions from an external device such as a processor. The semiconductor device 1 stores set information compressing information using restorable compression coding. When being operated, the semiconductor device 1 properly decodes the set information, and then, configures an execution circuit using the set information obtained by decoding.

The foregoing compression and decoding of the set information are realized in the following manner. A code having a bit length smaller than each portion of a bit string is assigned to each portion of bit strings forming the set information (referred to as "set bit"). A dictionary expressing the correspondence relationship between the code and each portion of the set information is prepared. In this way, each portion of the set information is expressed by the code and the dictionary. When the set information is decoded, the code and the dictionary are acquired to obtain the set information corresponding to the code from the dictionary.

The semiconductor device 1 has four operation units 10A to 10D, a controller 11, an input/output buffer 12, a code buffer 13 and a code transfer controller 14. Herein, data processing is a general term for a series of operations executing individual operations. The number of the operation units is not limited to the foregoing four.

The foregoing four operation units 10A to 10D realizing data processing are connected in the form of pipeline type. Data, compressed set bit dictionary information and set ID propagate every cycle via the operation unit 10D from the operation unit 10A. In this case, the compressed set bit dictionary information is information showing the correspondence relationship between a code and the original data. The set ID is an identifier for selecting one set bit from a plurality of set bits. The cycle is the minimum time unit in a synchronizing circuit until the next value of a storage element changes after a value thereof changes.

In addition, code information is information including the following pointer every operation. The pointer designates a position where a set bit determining operations executed by the operation units 10A to 10D by set ID designation transmitted from the controller 11 is stored in the foregoing dictionary information.

The controller 11 is connected to the operation unit 10A and the input/output buffer 12. The input/output buffer 12 is connected with the operation units 10A to 10D. The code buffer 13 is connected to the code transfer controller 14. The code transfer controller 14 is connected to the operation units 10A to 10D.

The input/output buffer 12 temporarily holds data given to the semiconductor device 1 when data processing is started, the intermediate or final result of data processing by the semiconductor device 1. Initial input data is written to the input/output buffer 12 from an external device such as a processor before data processing start. The semiconductor device 1 can continue data processing again using the intermediate result of the data processing held in the input/output buffer 12 as input data. The final result held in the input/output buffer 12 is read from the input/output buffer 12 by an external device such as a processor.

The code buffer 13 is stored with a program code of the controller 11 (hereinafter, referred to as "program code") and a compressed bit string (hereinafter, referred to as "compressed set bit"). The program code specifies a set ID issued by the controller 11 and an address of the input/output buffer 12 every cycle. The compressed set bit compresses set bit strings of the operation units 10A to 10D. The foregoing program code and compressed set bit string are written to the code buffer 13 by an external device such as a processor before data processing start.

The code transfer controller 14 reads a program code and a compressed set bit from the code buffer according to the instructions from the external device such as processor before data processing start. Then, the controller 14 transfers dictionary information of the foregoing program code and compressed set bit to the controller 11. Each portion of code information of the compressed set bit is transferred to any of the operation units 10A to 10D.

Each memory included in the operation units 10A to 10D can store a plurality of set bits, and corresponds to a set ID. Compression of the set bit is carried out for each set ID. The set bit of any of the operation units 10A to 10D corresponding to the same set ID is compressed, and thereby, dictionary information and code information are generated for each set ID. The code transfer controller 14 transfers these dictionary information and code information to the controller 11 and the operation units 10A to 10D.

The controller 11 has the following functions. One is a function of supplying a set ID and dictionary information of the compressed set bit corresponding to the set ID every cycle according to a program code recorded in a memory of the controller 11. Another is a function of controlling data read from the input/output buffer 12 and data write to the input/output buffer 12 according to the same program code as above. Data processing start is notified to the controller 11 by the external device such as processor. After the data processing is completed, the controller gives a notification of data processing completion to the external device such as processor.

In this embodiment, the semiconductor device 1 is connected to the external device such as processor. However, the semiconductor device 1 may be built in a processor. In this case, the controller 11 has a function of sending a set ID and dictionary information according to a program code of the processor, and controlling read/write of a memory and a register included in the processor.

Each of the operation units 10A to 10D is a unit having a decoder circuit for decoding a compressed set bit and an operator capable of setting every cycle. Each of the operation units 10A to 10D has the following function. According to the function, code information of the compressed set bit corresponding to the set ID sent from the controller 11 is read from a memory of the operation unit 10. Then, the decoder circuit decodes the set bit from dictionary information sent from the controller 11 and code information. Setting of the operator is changed according the set bit, and an operation with respect to input data is executed to output the result. Each of the operation units 10A to 10C transfers dictionary information used for decoding the set bit by connected pipeline next-stage, that is, the operation units 10B to 10D in the form of pipeline.

The foregoing pipeline transfer means the following transfer. For example, the operation result output by the operation unit 10A at a certain cycle and dictionary information is given as an input of the operation unit 10B at the next cycle. The output of the operation unit 10 is transferred between the operation units 10A to 10D forming the pipeline by one cycle.

The outline of each unit forming the semiconductor device according to this embodiment has been explained.

The following is an explanation about the outline of the flow from the start to the end of processing in the semiconductor device according to this embodiment. The processing by the semiconductor device 1 is largely classified into two, that is, initialization before data processing and data processing.

First, the foregoing initialization will be described below.

The external device such as processor stores input data to the semiconductor device 1 in the input/output buffer 12. In addition, the external device stores a program code for specifying an operation of the controller 11 and a compressed set bit of the operation units 10A to 10D in the code buffer 13.

Thereafter, the external device gives a notification of code transfer start to the code transfer controller 14. When receiving the notification, the code transfer controller 14 reads the program code and the compressed set bit from the code buffer 13. Then, the controller 14 transfers the program code and dictionary information of the compressed set bits to the controller 11. The controller 14 further transfers code information of the compressed set bits to the operation units 10A to 10D. The foregoing transferred program code and dictionary information of the compressed set bit are stored in a memory included in the controller. Each portion of the code information of the compressed set bit is stored in an internal memory of any of the operation units 10A to 10D.

The code transfer controller 14 gives a notification code transfer completion to the external device such as processor after code transfer is completed. When receiving the notification code transfer completion, the external device such as processor gives a notification of data processing start to the controller 11. The above-mentioned description is initialization.

The foregoing data processing will be described below.

The controller 11 interprets a program code stored in the internal storage every cycle, and then, transfers set ID and dictionary information of the compressed set bit corresponding to the set ID to the operation unit 10A according to the program code very cycle in the form of pipeline. The controller 11 further sends control information for data read and for data write to the input/output buffer 12 according to the same code every cycle.

Every when receiving a data read request from the controller 11, the input/output buffer 12 reads the stored data therein to transfer it to the operation unit 10A in the form of pipeline. Every when receiving a data write request, the buffer 12 writes data output from the operation unit 10D to there according to the information.

Every when receiving the set ID and the dictionary information of compressed set bit, the operation unit 10 reads one of code information of the compressed set bit stored in the internal storage according to the set ID. Thereafter, the operation unit 10 decodes the set bit using decoder based on the received dictionary information and the read code information. In this way, the decoded set bit is applied to an internal operator to change the setting of the operator.

The operation unit 10 generates dictionary information required for decoding the set bit by the pipeline next-stage operation unit 10. The generated dictionary information is transferred to the next-stage operation unit 10 in the form of pipeline together with the operation result of the operator.

When the controller 11 interprets all program codes, the controller 11 gives a notification of processing completion to an external device such as processor, and thus, data processing ends.

The external device such as processor reads the operation result of the semiconductor device stored in the input/output buffer 12 after a predetermined cycle or more elapsed after receiving the notification of processing completion. The predetermined cycle has the following two cycle number. One is a cycle number until the set ID issued finally by the controller 11 reaches the pipeline final-stage operation unit 10 after the controller 11 gives the notification of processing completion. Another is a cycle number added with a cycle number required for writing the operation result of the pipeline final-stage operation 10 to the input/output buffer 12.

The foregoing description is the flow from the start to the end of data processing in the semiconductor device 1 of this embodiment.

The following are some embodiments of the foregoing operation unit 10, controller 11 and code transfer controller 14 for realizing the processing in the semiconductor device 1. In these embodiments, the set ID is set to four kinds; however, the kind number of the set ID may be changed in accordance with the performance required by the semiconductor device 1. In accordance with the kind number of the set ID, the configuration of the foregoing operation unit 10, controller 11 and code transfer controller 14 is properly changed.

FIG. 2 is a block diagram showing the configuration for realizing a code transfer controller 14. The code transfer controller 14 has a unit tag generator 140, a code tag counter 141 and a code address counter 142. The code transfer controller 14 reads a program code of the controller 11 and a compressed set bit of the operation units 10A to 10D from the code buffer 13 according to a code transfer request given from the external device such as processor. Then, the controller 14 transfers the program code and the set bit to the controller 11 and the operation units 10A to 10D together with the read program code and a tag capable of uniquely identifying each storage of the controller 11 written with the read program code and set bit or of the operation units 10A to 10D. The controller 11 and the operation units 10A to 10D determines whether or not the tag added to the transferred code shows the storage of the controller 11 and the operation units 10A to 10D. If do so, the code transfer controller 14 writes the code to the storage.

Figure 3:
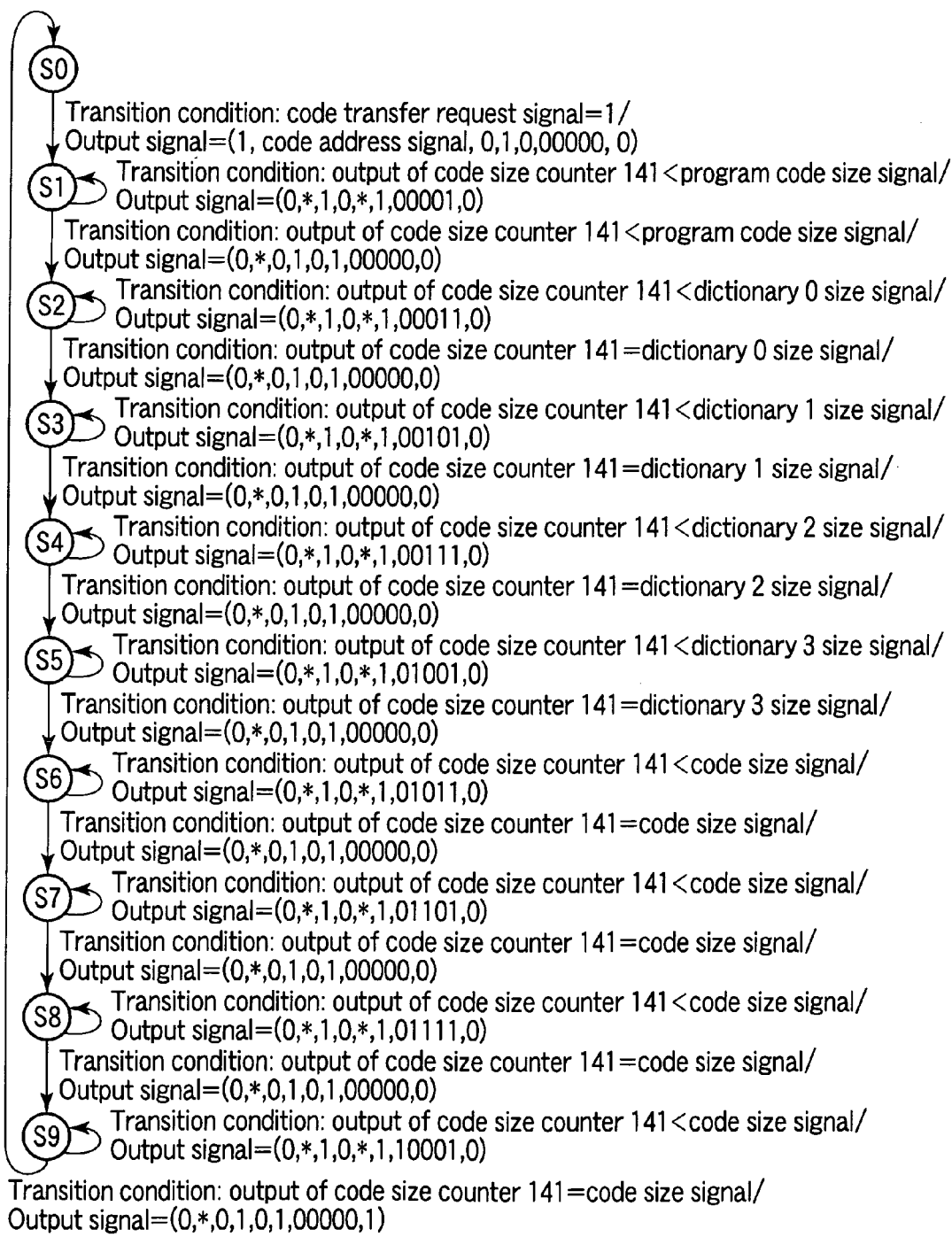
FIG. 3 is a state transition diagram to explain the operation of a unit tag generator according to one embodiment.

FIG. 3 is a state transition chart of a unit tag generator 140. The initial state is S0. When receiving a code transfer request from the external device such as processor, the state of the unit tag generator 140 changes from S0 to S1. In this case, a set signal 1 is given to the code tag counter 141 together with the initial value signal 0, and thus, the output of the code tag counter 141 becomes 0. The set signal 1 and a code transfer request address as the initial value signal are given to the code address counter 142. The output of the code address counter 142 becomes the address.

In a state S1, if the output of code tag counter 141 is smaller than a program code size signal of the code transfer request, the unit tag generator 140 reads a code from the address of the code buffer 13 shown by the code address counter 142. Then, the generator 140 adds a tag comprising a unit tag "00001" (binary-coded representation) showing a program code storage of the controller and a tag of a value of the code counter 141 to the foregoing code, and thereafter, transfers it to the controller and the operation units 10A to 10D. The transferred code is written to an address position shown by the code tag counter 141 in the program code storage of the controller 11. In this way, the state is changed to the state S1.

An increment signal 1 is output to the code tag counter 141 and the code address counter 142, and thus, these counter values are incremented one in the end of the cycle.

Conversely, in the state S1, if the output of code tag counter 141 is equal to the program code size signal of the code transfer request, a unit tag "00000" added with a value of the code tag counter 141 is added to the code as a code tag. The code is transferred to the controller and the operation units 10A to 10D. The transferred code is not recorded in any storages of the controller 11 and the operation units 10A to 10D. The output of the code tag counter 141 is reset to 0 in the end of the cycle, and the value of the code address counter 142 has no change. Then, the state is changed to a state S2.

Likewise, in states S2 to S5, dictionary information of the compressed set bit written to the controller 11 is successively transferred every set ID. In this case, the Kind of the set ID is four; therefore, four states are used. In states S6 to S9, code information of the compressed set bit written to the operation units 10A to 10D is transferred in the same manner as above. Unlike the states S2 to S5, the states S6 to S9 correspond to the operation unit 10A to 10D, and in each state, code information corresponding to each set ID is successively transferred.

In the state S9, if the output of code tag counter 141 is equal to the program code size signal of the code transfer request, a notification of code transfer completion is given to the external device such as processor so that the state returns to the state S0.

The foregoing description relates to the realized example and the operation of the code transfer controller 14.

Figures 4, 5:
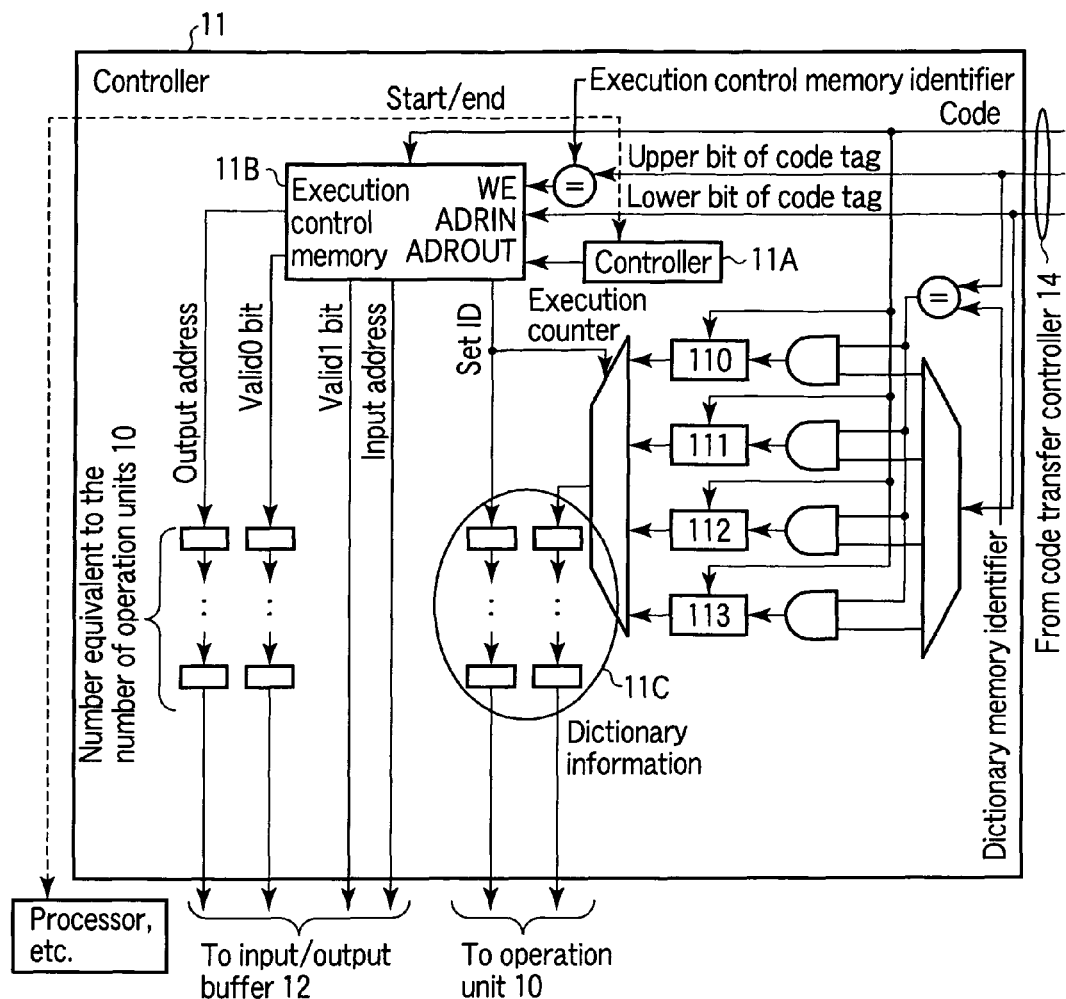
FIG. 4 is a block diagram showing a controller according to one embodiment.
FIG. 5 is a view showing one example of a program code stored in an execution control memory according to one embodiment.

FIG. 4 is a block diagram showing the configuration for realizing a controller 11. The controller 11 has a controller 11A, an execution control memory 11B and dictionary memories 110 to 113. The controller 11A is connected to the execution control memory 11B. The execution control memory 11B is recorded with a program code executed by the controller 11. Dictionary information of the compressed set bit of the operation units 10A to 10D is recorded in the dictionary memories 110 to 113 every set ID. The number of the dictionary memories 110 to 113 is equal to the number of kinds of the set ID.

Write to the execution control memory 11B and dictionary memories 110 to 113 is carried out in initialization. A comparison is made between the upper 3-bit of a code tag added to the code transferred from the code transfer controller 14 and each identifier of the execution control memory 11B and dictionary memories 110 to 113. The comparison result is given as a write allowable signal to the execution control memory 11B and dictionary memories 110 to 113. If the write allowable signal is 1, the code is written to address shown by the lower bit of the code tag transferred from the code transfer controller 14.

When the external device such as processor gives a notification of data processing start, the controller 11A interprets a program code stored in the execution control memory 11B in the order from address 0, and then, executes an operation according to the content.

FIG. 5 shows a structure example of the program code stored in the execution control memory 11B. According to the structure example, a program code has an input address, a ValidI bit showing whether or not the input address is valid, an output address, a ValidO bit showing whether or not the output address is valid, and a set ID. The foregoing program code is executed by one line at one cycle.

When sending control information for data read to the input/output buffer 12, the controller 11A interprets the input address and the ValidI bit from the program code, and then, sends them to the input/output buffer 12. If the ValidI bit is 1, the input/output buffer 12 reads data existing at a location (position) shown by the input address, and then, sends it to the operation unit 10A.

When sending control information for data write to the input/output buffer 12, the controller 11A interprets the output address and the ValidO bit from the program code, and then, sends them to the input/output buffer 12. These control information reaches the input/output buffer 12 after the number of cycles equivalent to that of the operation units 10. If the ValidO bit is 1, the input/output buffer 12 writes data output by the operation unit 10D to a location shown by the output address.

When transferring the set ID to the operation unit 10 in the form of pipeline, the controller 11A interprets the set ID from the program code, and then, sends it to the operation unit 10A. In addition, the controller 11A reads dictionary information of the compressed set bit from any of dictionary memories 110 to 113 according to the set ID, and then, sends it to the operation unit 10A. According to the example of realizing the code transfer controller 14 shown in FIG. 2 and FIG. 3, set ID0 to 3 correspond to dictionary memories 110 to 113.

The control must be made so that the following two times are equal. One is time until the input data is sent to the operation unit 10A after the controller sends control information for data read to the input/output buffer 12. Another is time until the set ID and dictionary information are sent to the operation unit 10A after the controller 11 sends the set ID and dictionary information of the compressed set bit.

In order to realize the foregoing control, if several cycles are required for data read from the input/output buffer 12, a latch 11C for timing control shown in FIG. 4 is inserted by some cycles. The time until the set ID and the dictionary information are sent to the operation unit 10A is delayed for several cycles.

As described above, the controller 11A interprets the program code of the execution control memory 11B in the order from address 0. When the controller 11A interprets all program codes, the controller 11A gives a notification of processing completion to the external device such as processor, and then, stops the operation.

The foregoing description relates the example of realizing the controller 11 and the operation.

FIG. 6 is a block diagram showing the configuration for realizing an operation unit 10. The operation unit 10 has an operator 100, a set bit memory 101, a decoder 102, a data pipeline register 103, control pipeline registers 104A and 104B. A data input signal of the operator 100 is connected to the input/output buffer 12 in the operation unit 10A. In the operation units 10B to 10D, the data input signal is connected to each data pipeline register 103 of pipeline pre-stage operation units 10A to 10C. A set input signal of the operator 100 is connected to the data pipeline register 103.

A read address signal of the set bit memory 101 is connected to a set ID output signal of the controller 11 in the operation unit 10A. In the operation units 10B to 10D, the set ID output signal is connected each control pipeline register 104A of pipeline pre-stage operation units 10A to 10C. A write control signal of the set bit memory 101 is connected to the code transfer controller 14. A data output signal of the set bit memory 101 is connected to a code input signal of the decoder 102.

The read address signal of the set bit memory 101 is further connected to an input terminal of the control pipeline register 104A. A dictionary input signal of the decoder 102 is connected to a dictionary output signal of the controller 11 in the operation unit 10A. In the operation units 10b to 10D, the dictionary input signal is connected each control pipeline register 104B of pipeline pre-stage operation units 10A to 10C.

Write to the set bit memory 101 is carried out in initialization. A comparison is made between upper three bits of the code tag added to the code transferred from the code transfer controller 14 and an identifier showing the set bit memory 101. The comparison result is given as a write allowable signal to the set bit memory 101. If the write allowable signal is 1, the code is written to an address shown by lower bits of the code tag transferred from the code transfer controller 14.

Figure 7:
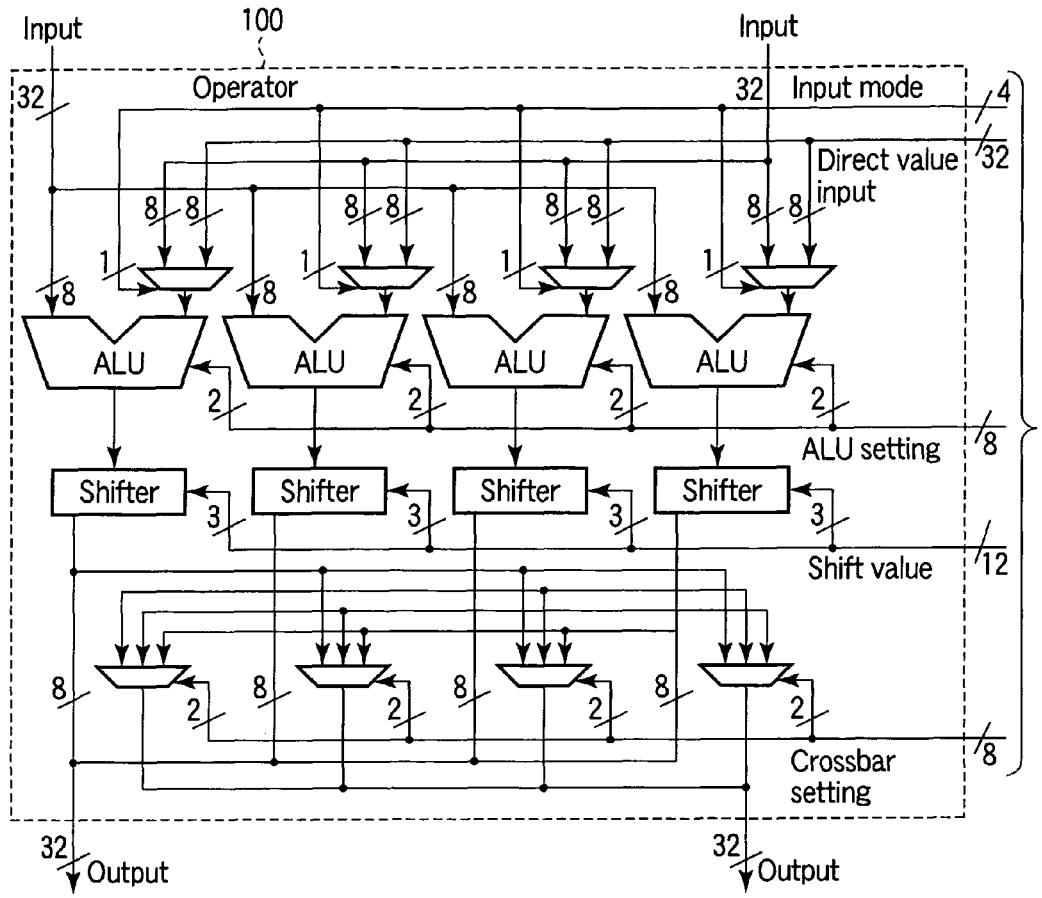
FIG. 7 is a block diagram showing an operator according to one embodiment.

FIG. 7 is a block diagram showing one example of an operator 100. The operator 100 includes four 8-bit ALUs and shifters. The operator 100 is settable so that different operations are made at a 8-bit unit. The operation result is set as one of a 32-bit output. The operator 100 further includes a crossbar switch. The result of changing the arrangement order of four 8-bit outputs from the shifters is set as one of a 32-bit output.

The set bit length comprises 16 bits in total per an 8-bit operation. Specifically, an input mode for determining whether or not one of the input of the ALU is set as a direct value is one bit, the direct value is 8 bits, ALU set is 2 bits, a shift value is 3 bits, and crossover switch set is 2 bits. The operator 100 has a set bit of 64 bits in total.

An example of realizing a decoder 102 included in the operation unit 10 will be described below.

The configuration of the decoder 102 depends on how to compress a set bit of the operation unit 10. In this case, three compression method are shown, and an example of realizing the decoder 102 according to each method is shown. The configuration of the operation 100 is as shown in FIG. 7.

Figure 8:
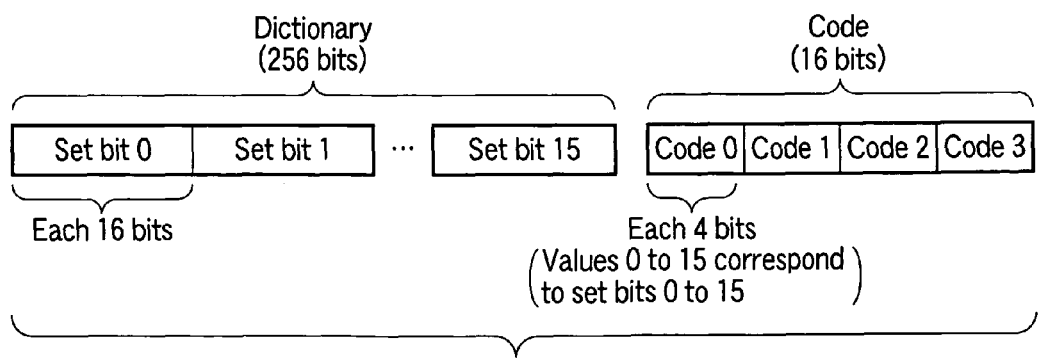
FIG. 8 is a view to explain the relationship between dictionary information and code information according to a compression method 1.

FIG. 8 is a view to explain a compression method 1. According to the compression method 1, the dictionary information size is set as 256 bits, and the code information size is set as 16 bits per operation unit 10. Dictionary information expresses setting of all 8-bit operations executed by the operation units 10A to 10D in the set ID. In the operation, a set bit having 16 bits is required per the 8-bit operation. In this case, the dictionary information can express 16 8-bit operations to the maximum.

Code information sets four 8-bit operations executed in the operation unit 10. Namely, the code information expresses a dictionary location bit showing whether any of 8-bit operation setting shown by the dictionary information is used. In this case, the dictionary information expresses 16 8-bit operations to the maximum. Thus, 4 bits are required per the 8-bit operation executed by the operation unit in order to specify one setting from the dictionary information. Therefore, the code information per operation unit is 16 bits.

Figure 9:
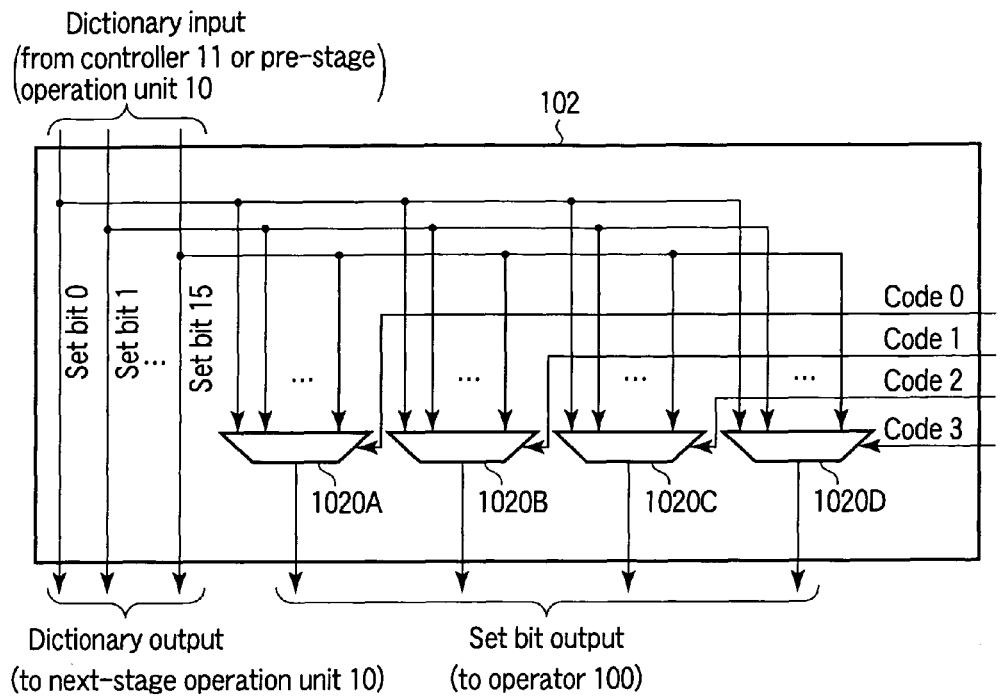
FIG. 9 is a block diagram showing a decoder in the compression method 1 according to one embodiment.

FIG. 9 is a block diagram showing the decoder 102 for realizing the compression method 1. The decoder 102 has multiplexers 1020A to 1020D. The multiplexers 1020A to 1020D are each supplied with codes for four 8-bit operation expressed by the code information as a select signal. The decoder selects one from 16 set bits supplied as dictionary information from the controller according to the select signal. In this way, the decoder 102 decodes the set bit from the code information. The decoder 102 further outputs the input dictionary information intact as dictionary information used for the next-stage operation unit 10.

According to the compression method 1, the total sum of the size required for code information of operation units 10A to 10D is 64 bits regardless of setting of the operation units 10A to 10D. If the number of kinds of 8 bit operation executed by the operation units 10A to 10D is less than 12, the total of the dictionary information size and the code information size becomes smaller than the set bit size before compression, that is, 256 bits. Thus, this serves to reduce information written to the storage of the controller and the operation units 10A to 10D.

Figure 10:
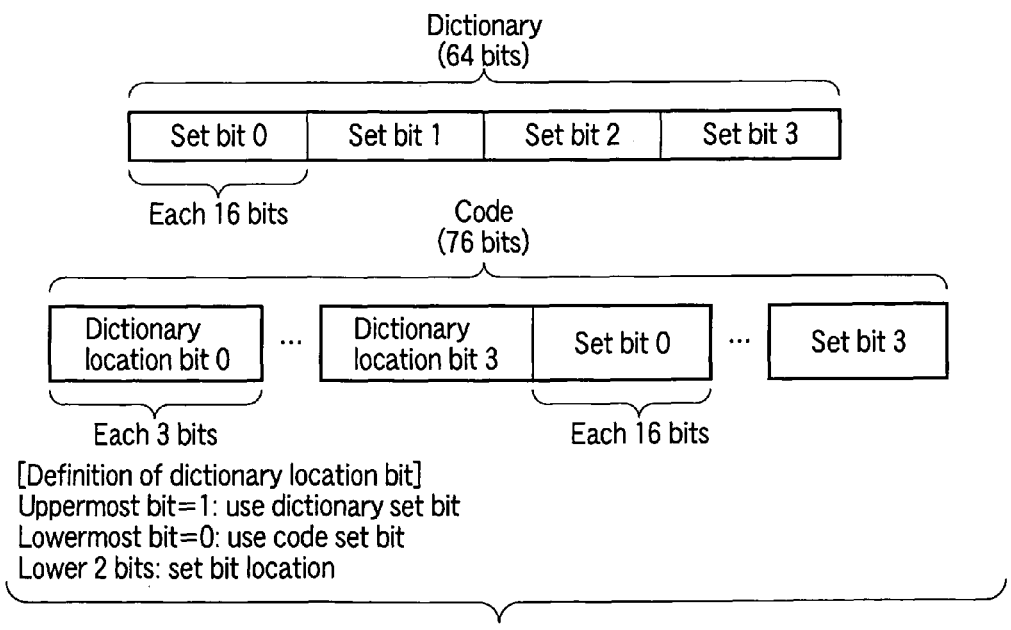
FIG. 10 is a view to explain the relationship between dictionary information and code information according to a compression method 2.

FIG. 10 is a view to explain a compression method 2. According to the compression method 2, the dictionary information size is set as 64 bits, and the code information size is set as 76 bits per operation unit 10. The dictionary information expresses four 16-bit operation set bits. The upper 12 bits of the code information express four dictionary location bits each having 3 bits. The dictionary location bit shows which of a set bit shown by dictionary information and a set bit shown by the lower bit of the code information should be used every 8-bit operation. The lower 64 bits of the code information express an operation set bit, which is not included in the dictionary information from the upper bit in the operation executed by the operation unit 10.

Figure 11:
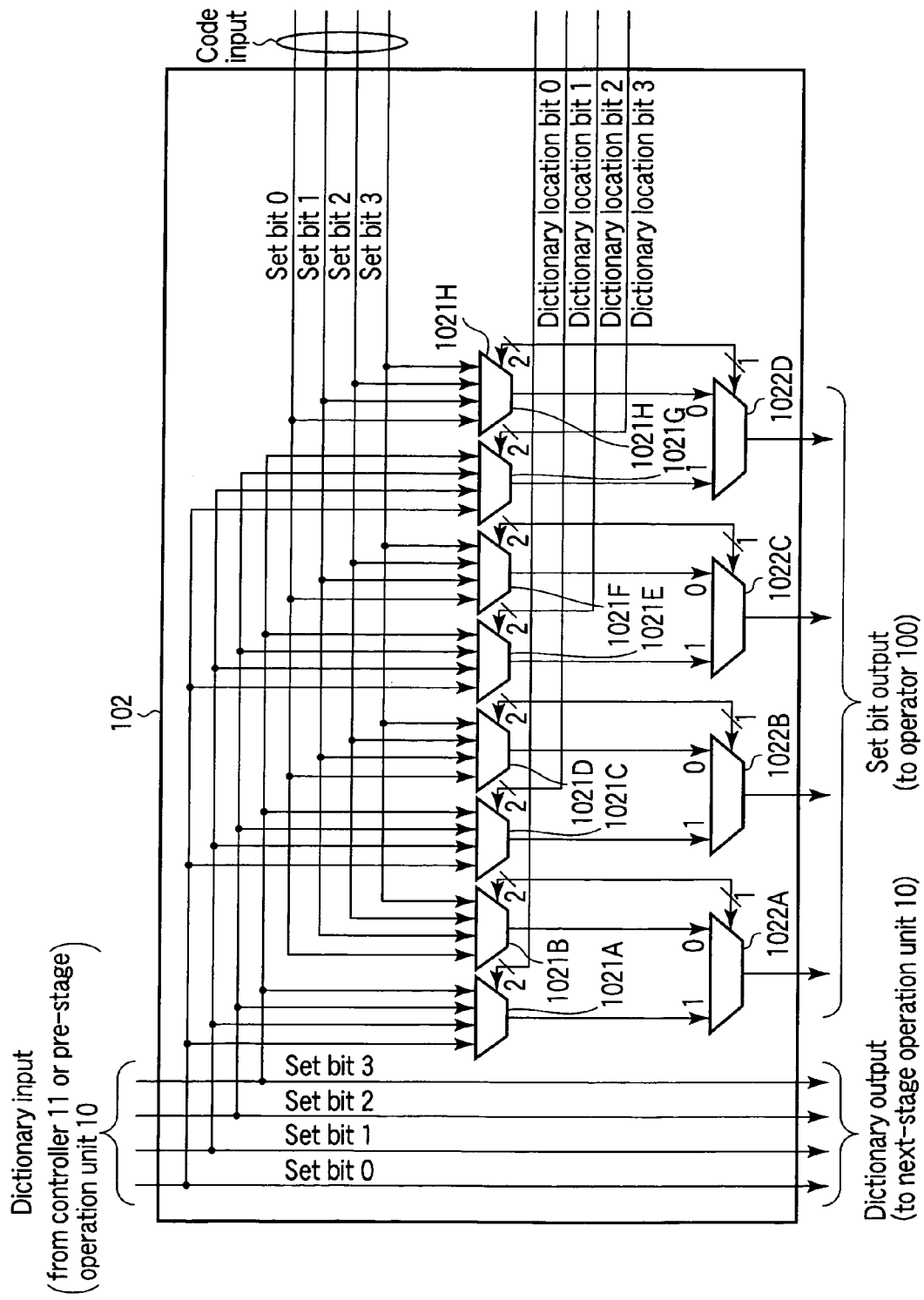
FIG. 11 is a block diagram showing a decoder in the compression method 2 according to one embodiment.

FIG. 11 is a block diagram showing a decoder 102 for realizing the compression method 2. The decoder 102 has multiplexers 1021A to 1021H and multiplexers 1022A to 1022D. The multiplexers 1021A to 1021H are each supplied with the lower 2 bits of the dictionary location bit recorded to the code information as a select signal. Then, the multiplexers 1021A to 1021H each select one from the dictionary information set bit supplied from the controller and one from the set bit of the code information every operator 100 according to the foregoing select signal. According to the uppermost bit of dictionary use bit recorded to the code information, the multiplexers 1022A to 1022D each select any one of the set bit of dictionary information and the set bit of code information. In this way, the decoder 102 decodes the set bit from code information. The decoder 102 further outputs the input dictionary information intact as dictionary information used for the next-stage operation 10.

According to the compression method 2, the dictionary location bit size per 8-bit operation is 3 bits reducing 1 bit compared with the compression method 1. Thus, if the most effective compression is made, the total sum of the dictionary information size and the code information size becomes smaller than the compression method 1. However, the operation unit 10 receives four kinds of 8-bit operations only as the dictionary information. Thus, if the number of the kind of 8-bit operation executed by the operation units 10A to 10D is 5 or more, the following problem arises. Specifically, the same set bit overlaps in code information of two or more operation units 10 depending on a pattern of using the 8-bit operation in common between the operation units 10A to 10D. If the foregoing overlap occurs two times or more, the compression efficiency of the compression method 2 is reduced compared with the compression method 1.

If the number of 8-bit operations recorded to the dictionary information and the code information is less 13 including overlap, the total sum of the dictionary information size and code information size after compression becomes smaller than the set bit size before compression.

Figure 12:
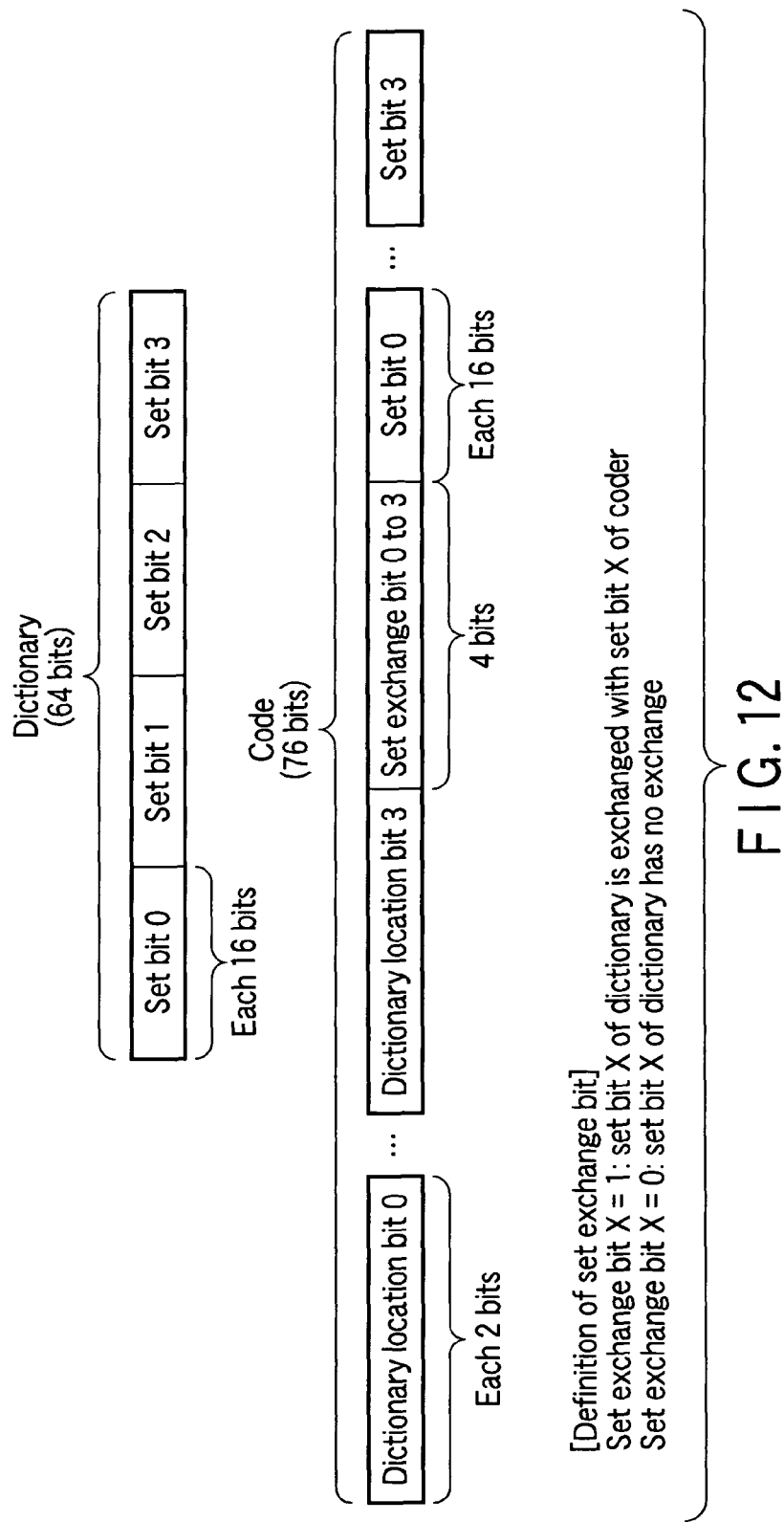
FIG. 12 is a view to explain the relationship between dictionary information and code information according to a compression method 3.

FIG. 12 is a view to explain a compression method 3. According to the compression method 3, the dictionary information size is set as 64 bits, and the code information size is set as 76 bits per operation unit 10, like the compression method 2. Like the compression method 2, four set bits of 16-bit operation are recorded in the dictionary information. The upper 8 bits of the code information express four dictionary location bits having 2 bits. The dictionary location bit shows which of set bits recorded to the dictionary information should be used. The next 4 bits of the code information express a set exchange bit. The set exchange bit shows an 8-bit operation, which is not used for the next-stage operation unit, of the set bits of the dictionary information. The lower 64 bits of the code information express a set bit of an operation, which is not included in the dictionary information, of the 8-bit operations used for the next-stage operation unit.

FIG. 13 is a block diagram showing a decoder 102 for realizing the compression method 3. The decoder 102 has multiplexers 1023A to 1023D, multiplexers 1024A to 1024C, priority encoders 1025A to 1025C and multiplexers 1026A to 1026D. The multiplexers 1023A to 1023D are each supplied with a dictionary location bit as a select signal. The multiplexers 1023A to 1023D each select one set bit from four set bits of the dictionary information according to the select signal, and thereby, the decoder 102 decodes the set bit from the code information.

The priority encoders 1025A to 1025C are each supplied with a set exchange bit. A bit location (the lowermost bit: 0, the uppermost bit: 3) of the set exchange bit in which 1 appears from the first to the third in the set exchange bit is output. If the number of 1 of the set exchange bit is less than a predetermined number, the priority encoders 1025A to 1025C each output 0. The outputs of the priority encoders 1025A to 1025C are given as a select signal of the multiplexers 1024A to 1024C. In this way, the multiplexers 1024A to 1024C each output a set bit exchanged with the first to third set bits of the dictionary information. Each bit of the set exchange bits is set as a select signal of each of the multiplexers 1026A to 1026D. In this way, each set bit of the 8-bit operation included in the dictionary information, set bits output from the multiplexers 1024A to 1024C and each of set bits stored in the lower 16 bits of the code information are selected. The multiplexer 1026D selects the set bit 3 of the dictionary information and the set bit 3 of the code information. The decoder outputs the output from each of the multiplexers 1026A to 1026D as dictionary information used for the next-stage operation unit 10.

According to the compression method 3, dictionary information is changeable in a process of flowing through the pipeline of the operation units 10A to 10D. Thus, compared with the compression method 2, which needs the same set bit to be overlapped within code information of the operation units 10, the overlap does not occur in the compression method 3. For example, the operation units 10A and 10B and the operations units 10C and 10D each execute different four kinds of 8-bit operations. However, in case the operation units 10A and 10C and the operations units 10B and 10D each execute the same 8-bit operation, code information of the operation units 10B to 10D must be stored with four kinds of set bits according to the compression method 3. For this reason, the compression efficiency of the compression method 3 becomes worse compared with the compression methods 1 and 2.

The compression methods 1 to 3 and the examples of realizing the decoders 102 corresponding thereto have been described above. As seen from the foregoing description, the compression method having the most compression efficiency is different depending on a common use pattern of the 8-bit operation of the operations 10A to 10D. Therefore, to employ better compression method for each use pattern, the dictionary information may be added with a 2-bit compression method ID showing whether any of the compression methods 1 to 3 should be employed. In addition, the operation unit 10 includes three decoders 102 corresponding to the compression methods 1 to 3. In this way, according to the compression method ID, the decoder used for decoding the set bit may be selected to decode the set bit.

The example for realizing the operation unit 10 has been described above. In order to explain the operation of the operation unit 10, the operation when the semiconductor device 1 executes data processing will be described below.

Figure 14:
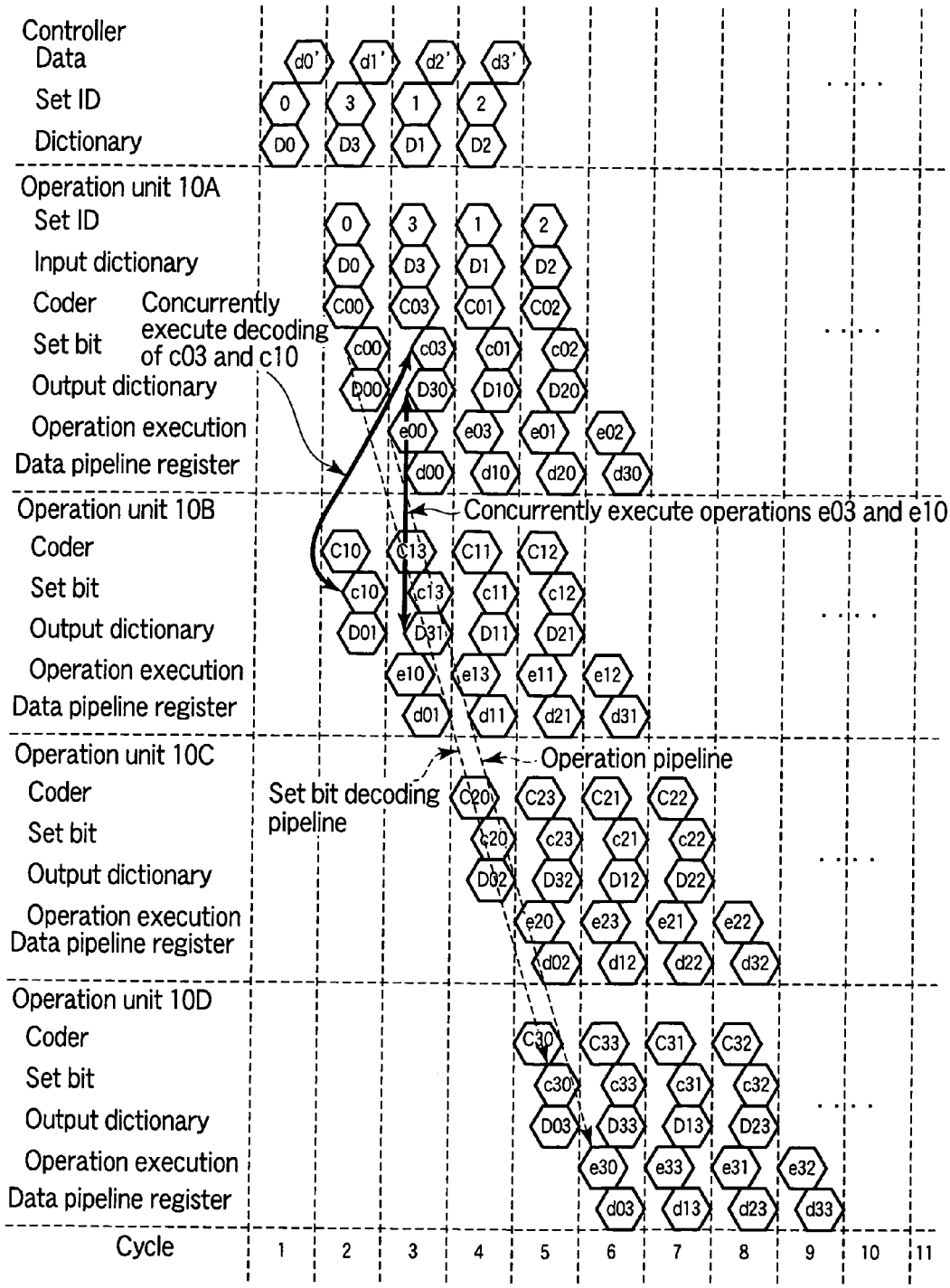
FIG. 14 is a timing chart to explain the operation for each cycle of the controller and each operation unit.

FIG. 14 is a timing chart to explain the operation when the semiconductor device 1 executes data processing. At the time of the cycle 1, program code and dictionary information of the compressed set bit are stored with the storage of the controller 11. Code information of the compressed set bit is stored with the operation units 10A to 10D.

In the cycle 1, the controller 11 sends a set ID "0" and dictionary information "D0". The controller further sends data "d0" via the input/output buffer 12.

In the cycle 2, the operation unit 10A receives the set ID "0", and then, reads code information "C00" from an address 0 of the set bit memory 101. The decoder 102 decodes a set bit "c00" from the dictionary information "D0" and the code information "C00", and then, input the decoded result to the operator 100. The decoder 102 further sends dictionary information "D00" to the operation unit 10B according to the rule given by the foregoing compression method. In the cycle 2, the controller 11 sends a set ID "3" and dictionary information "D3". The controller 11 further sends data "d1" via the input/output buffer 12.

In the cycle 3, the operator 100 of the operation unit 10A uses the data "d0" as input in setting of a set bit "c00" to execute an operation "e00". Thereafter, the operator 100 writes the operation result "d00" to the data pipeline register 103. The decoder 102 decodes a set bit "c03" from code information "C03" read from an address 3 of the set bit memory 101 and dictionary information "D3", and then, input it to the operator 100. Simultaneously, the decoder 102 sends dictionary information "D30" to the operation unit 10B. In the cycle 3, the operation unit 10B receives a set ID "0", and reads code information "C10" from an address o of the set bit memory 101. The decoder 102 further decodes a set bit "c10" from dictionary information "D00" and code information "C10", and then, input it to the operator 100. Simultaneously, the decoder 102 sends dictionary information "D01" to the operation unit 10C. In the cycle 3, the controller 11 sends a set ID "1" and dictionary information "D1". The controller 11 further sends data "d2" via the input/output buffer 12.

In the cycle 4, the operator 100 of the operation unit 10A uses the data "d1" as input in setting of a set bit "c03" to execute an operation "e03". Thereafter, the operator 100 writes the operation result "d10" to the data pipeline register 103. The decoder 102 decodes a set bit "c01" from code information "C01" read from an address 3 of the set bit memory 101 and dictionary information "D1", and then, input the decoded set bit to the operator 100. Simultaneously, the decoder 102 sends dictionary information "D10" to the operation unit 10B. In the cycle 4, the operator 100 of the operation unit 10B uses the data "d00" as input in setting of a set bit "c10" to execute an operation "e10". Thereafter, the operator 100 writes the operation result "d01" to the data pipeline register 103. The decoder 102 decodes a set bit "c13" from code information "C13" read from an address 3 of the set bit memory 101 and dictionary information "D30", and then, input it to the operator 100. Simultaneously, the decoder 102 sends dictionary information "D31" to the operation unit 10C. In the cycle 4, the operation unit 10C receives the set ID "0", and then, reads code information "C20" from an address 0 of the set bit memory 101. The decoder 102 decodes a set bit "c20" from the dictionary information "D01" and the code information "C20", and then, input the decoded set bit to the operator 100. Simultaneously, the decoder 102 sends dictionary information "D02" to the operation unit 10C. In the cycle 4, the controller 11 sends a set ID "2" and dictionary information "D02". The controller 11 further sends data "d3" via the input/output buffer 12.

In the cycles after this the operation of the controller 11 and the operation units 10A to 10D is the same as above; therefore, the explanation is omitted. The operation when the semiconductor device 1 executes data processing has been described above.

As described above, in the semiconductor device 1, the operation units 10A to 10D decode each set bit of the operation units 10 using the dictionary information of compressed set bit received every cycle as shown in FIG. 14. Thus, even if the number of the operation units included in the semiconductor device 1 increases, time spent for one cycle does not increase.

In the semiconductor device 1, the dictionary information is transferred from the controller 11 to the operation units 10A to 10D in the form of pipeline to decode the set bit. As shown in the cycle 3 of FIG. 14, a plurality of operation units 10 can concurrently decode the compressed set bit every cycle. As shown in the cycle 4 of FIG. 14, a plurality of operation units 10 can execute the operation using the decoded set bit in parallel, in the operator 100 every cycle.

According to this embodiment, each of pipeline-connected operation units 10 changes setting of the operator 100 by the set bit decoded from the compressed set information, and executes an operation without delay.

The foregoing semiconductor device is used, and thereby, setting information of the dynamically reconfigurable circuit is stored in the storage in the compressed form. Thus, this serves to shorten time spent for writing setting information to the storage.

In addition, the foregoing semiconductor device is used, and thereby, it is possible to simultaneously and easily achieve operation execution by the dynamically reconfigurable circuit and write of new setting information to the storage. Therefore, this serves to improve an information processing speed of the semiconductor device having the pipeline-connected dynamically reconfigurable circuit.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A semiconductor device, comprising:
a first operation unit which:
stores first code information having a bit length shorter than a first set bit,
receives dictionary information containing set bits, each of which relates to each code information,
reads a set bit related to the first code information from the dictionary information as the first set bit, and further,
changes setting according to the first set bit to execute any of a plurality of operations so as to obtain an operation result; and
a second operation unit which:
stores second code information having a bit length shorter than a second set bit,
receives the dictionary information from the first operation unit,
reads a set bit related to the second code information from the dictionary information as the second set bit, and further,
changes setting according to the second set bit so as to execute any of the operations with respect to the operation result.

2. The device according to claim 1, further comprising:
a controller which stores a plurality of the dictionary information corresponding to a plurality of set IDs, and sends any of the set IDs and dictionary information corresponding to the set ID to the first operation unit.

3. The device according to claim 2, wherein the first operation unit includes a first storage storing a plurality of code information corresponding to a plurality of set IDs, and receives any of the set IDs from the controller, and further, reads the corresponding first code information from the first storage to obtain the first set bit, and
the second operation unit includes a second storage storing a plurality of code information corresponding to a plurality of set IDs, and receives any of the set IDs from the controller, and further, reads the corresponding second code information from the second storage to obtain the second set bit.

4. The device according to claim 2, wherein the dictionary information includes all kinds of set bits for determining the operations executed by the first operation unit according to a designation of a set ID sent from the controller and the operations executed by the second operation unit according to a designation of a set ID sent from the controller.

5. The device according to claim 4, wherein the first code information includes a pointer for designating a location where a set bit determining the operations executed by the first operation unit according to a designation of a set ID sent from the controller is stored in the dictionary information, every operations, the first operation unit reads a set bit from the dictionary information received from the controller according to the pointer to obtain the first set bit, and executes an operation determined by the first set bit, and further, sends the dictionary information to the second operation unit, the second code information a pointer for designating a location where a set bit determining the operations executed by the second operation unit according to a designation of a set ID sent from the controller is stored in the dictionary information received from the first operation unit, every operations, and the second operation unit reads a set bit from the dictionary information received from the first operation unit according to the pointer included in the second code information to obtain the second set bit, and executes an operation determined by the second set bit.

6. The device according to claim 2, wherein the dictionary information includes a part of all kinds of set bits for determining the operations executed by the first operation unit according to a designation of a set ID sent from the controller and the operations executed by the second operation unit according to a designation of a set ID sent from the controller.

7. The device according to claim 6, wherein the first code information includes a set bit, which is not included in the dictionary information, of set bits for determining the operations executed by the first operation unit according to a designation of a set ID sent from the controller, and includes a pointer for designating a location where the set bits for determining the operations are stored in the dictionary information and the first code information every operations, the first operation unit reads a set bit from the first code information and dictionary information received from the controller according to the pointer included in the first code information to obtain the first set bit, and executes an operation determined by the first set bit, and further, sends the dictionary information to the second operation unit, the second code information includes a set bit, which is not included in the dictionary information received from the first operation unit, of set bits for determining the operations executed by the second operation unit according to a designation of a set ID sent from the controller, and includes a pointer for designating a location where the set bits for determining the operations are stored in the dictionary information and the second code information every operations, and the second operation unit reads a set bit from the second code information and dictionary information received from the first operation unit according to the pointer included in the second code information to obtain the second set bit, and executes an operation determined by the second set bit.

8. The device according to claim 4, wherein the first code information includes:

a pointer for designating a location where a set bit determining the operations executed by the first operation unit according to a designation of a set ID sent from the controller is stored in the dictionary information;

a set bit, which is not included in dictionary information, of set bits for determining a plurality of operations executed by the second operation unit according to a designation of a set ID sent from the controller; and a bit vector for designating a location where a set bit, which is not included in set bits for determining a plurality of operations executed by the second operation unit, the first operation unit reads a set bit from dictionary information received from the controller according to the pointer included in the first code information to obtain the first set bit, and executes an operation determined by the first set bit, and replaces a set bit, which is not included in set bits for determining a plurality of operations executed by the second operation unit with a set bit included in the first code information, and sends the replaced set bit to the second operation unit as dictionary bit, code information on the second storage includes a pointer for designating a location where a set bit determining the operations executed by the first operation unit according to a designation of a set ID sent from the controller is stored in the dictionary information, and the second operation unit reads a set bit from dictionary information received from the first operation unit according to a pointer included in the second storage to obtain the second set bit, and executes an operation determined by the second set bit.

\* \* \* \* \*